United States Patent [19]

Chisholm

[11] 4,130,233

[45] Dec. 19, 1978

[54] PROCESS FOR MAKING POROUS METAL HEAT SINK FROM CLAD ALUMINUM WIRE

[76] Inventor: John Chisholm, River Terrace La., Jupiter, Fla. 33458

[21] Appl. No.: 799,642

[22] Filed: May 23, 1977

[51] Int. Cl.$^2$ .................... B23K 31/02; B23P 15/26
[52] U.S. Cl. ................... 228/126; 228/141.1; 228/158; 228/173 E; 228/183; 228/190
[58] Field of Search .............. 228/158, 173, 176, 183, 228/190, 205-206, 219-221, 246, 263, 126, 141.1

[56] References Cited

U.S. PATENT DOCUMENTS

| | | | |
|---|---|---|---|
| 3,050,115 | 8/1962 | Leitzel | 228/190 X |
| 3,416,218 | 12/1968 | Armenoff | 228/263 X |
| 3,762,031 | 10/1973 | Jonason | 228/183 X |
| 3,999,699 | 12/1976 | Chisholm | 228/173 |

Primary Examiner—Donald G. Kelly

[57] ABSTRACT

A method of making porous metal heat sinks from aluminum is described. The sink, in its simplist form, is composed of layers of aluminum wire mesh randomly stacked and brazed together to form a rigid porous metal panel. Devices to be heated (or cooled) are mounted on the panel and forced air passed through the panel creating abundant heat transfer due to large surface area and favorable thermal conductivity of aluminum. Tortuous air passages through the wire mesh create conditions favorable for turbulence which further facilitates heat transfer. Advance in the state-of-the-art is the novel manufacturing method of making a low cost heat sink whose thermal performance is only slightly less than that of higher cost copper wire sinks. A secondary application of the invention is for the formation of metallic filtration material designed for filtering under controlled temperature conditions. Careful selection of wire size, weave, calendering, and layer orientation as well as the brazing process provide the necessary constituents for control of particulate size. The method is in contrast to that disclosed in U.S. Pat. No. 3,999,699 issued to John Chisholm (1976) in which layers of the laminate are fused together by more conventional techniques producing a higher performance and more expensive laminate.

7 Claims, 6 Drawing Figures

PROCESS FOR MAKING POROUS METAL HEAT SINK FROM CLAD ALUMINUM WIRE

SUMMARY OF THE INVENTION

This invention relates primarily to fabrication of a unique type of compact heat exchanger or heat sink whose convective surface comprises a matrix of wires tightly packaged in small volume. When forced air is passed through the matrix the flow conditions become turbulent at relatively low gas velocity thereby providing superior heat transfer from wire of the matrix to the cooling medium. Layers of the matrix are bonded together by vacuum brazing which provides good thermal conductivity across the intersections (discontinuities) of the warp and woof wires and between the layers of the laminate.

A related technology exists for porous metal copper sinks (see inventor's U.S. Pat. No. 3,999,699) but is not applicable to aluminum due to aluminum's predisposition for oxide formation. The rapidity with which oxide forms on aluminum prohibits bonding by presently conventional brazing or sintering techniques. It is desirable to have a process for aluminum wire sinks as an alternative to copper because of the lower cost of aluminum. Applications for this process will be useful in a variety of heating and cooling situations including space heating and cooling, heat pipe sources and sinks, and thermal management for electrical devices such as semiconductors etc.

The technique of making aluminum wire suitable for brazing is a cladding process in which a billet of pure aluminum is encased in an envelope of aluminum brazing stock and extruded into wire of a suitable diameter. Pure aluminum is used in the core because of its high thermal conductivity. The cladding material is an aluminum alloy of slightly lower melting temperature than the wire. The composite wire is woven into a mesh which becomes the lamina of a metal matrix. Bonding of the matrix is accomplished by placing the composite wire mesh laminate in a vacuum furnace and melting the clad in an oxygen free atmosphere.

The process of cladding aluminum alloy with pure aluminum for corrosion resistance is well known under the trade name "Alclad." However, the converse procedure — cladding a pure aluminum core with a lower melting temperature alloy for purposes of forming a heat sink is considered novel.

In applications where the use of porous metal is particulate filtering under controlled temperature conditions — two or more calendering operations are generally made, one before brazing and one or more after brazing. The initial roll maximizes the area of contact at thermal path discontinuities and fixes the location of wires in the mesh — subsequent calendering results in establishing the ultimate size of the openings. Using this technique it is possible to make filters with uniform openings down to a few microns. Where very fine filaments are used it is advantageous to include one or more lamina of coarser wire to insure structural strength.

In the drawings I have shown the significant stages in the manufacture of porous metal aluminum sinks beginning with the metal billet and continuing through the process to the final matrix and variations thereof. In these showings:

Figure 6:
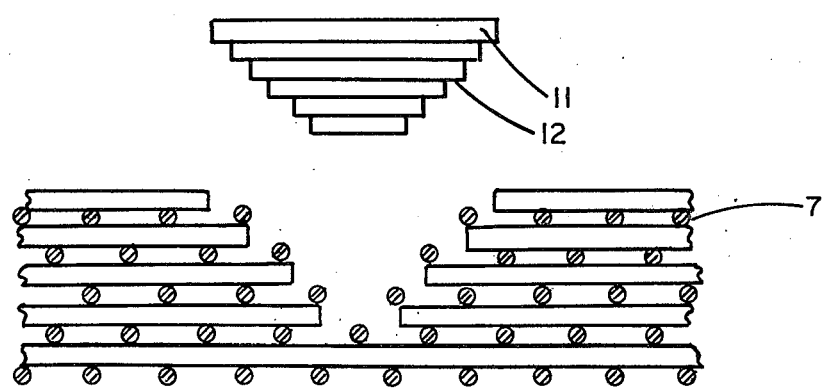

FIG. 6 is a fragmentary elevation view (exploded), showing the laminated mesh with the upper layers arranged in a non-coextensive manner with respect to the bottom layers forming a stepped hole or stepped channel in the matrix, one variation on the insert is included. The purpose of the stepped insert is to provide a solid metal thermal path from the heat source to the various layers of the laminate.

The first step in manufacturing the aluminum porous metal sink is to fabricate a closed-end tube of aluminum brazing stock. The stock is aluminum alloy whose melting temperature is slightly lower than that of pure aluminum. Silicon is frequently the principle alloying element. Such brazing stock is readily available in a number of forms from U.S. and Canadian manufacturers. Most forms have both Aluminum Association and AWS/ASTM designations.

Figure 1:
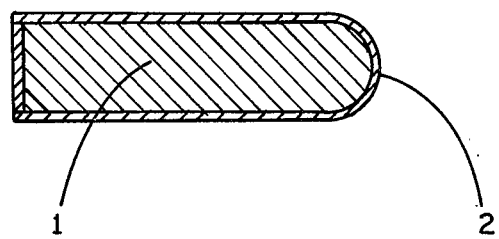
FIG. 1 is a fragmentary section of the elevation view of a billet of aluminum encased in a sheath of brazing stock.
Figure 2:
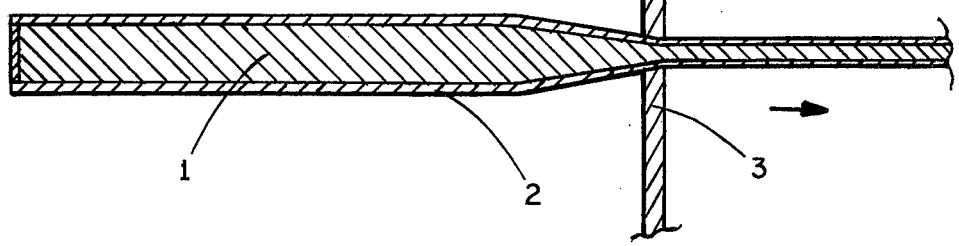
FIG. 2 is a fragmentary section of the elevation view of the encased aluminum undergoing its deformation to wire form.

Next, a billet of pure aluminum is encased within the closed-end tube as shown in FIG. 1; Part 1 is the aluminum and Part 2 is the brazing stock. The tube wall thickness is chosen such that in subsequent deformation of the encased billet a skin of brazing stock (about 0.001 inch thickness) envelopes the surface of the wire. Deformation is accomplished by established techniques of swagging, extrusion and draws. FIG. 2 depicts the deformed billet passing through the draw die; Part 1 is the aluminum, Part 2 is the brazing stock and Part 3 is the die. The resulting product is a clad wire. This composite metal is distinguished from other aluminum clad metals in that the pure aluminum is the core material as opposed to the usual application in which pure aluminum is used for protective cladding by virtue of its tendency for immediate oxide formation; the oxidized surface providing an impervious outer coat. In the intended application it is desireable that the principle constituent posses maximum thermal conductivity. This condition is realized through the use of pure metal in the core as opposed to the lower thermal conductivity shown by most aluminum alloys. Compensation for the reduced conductivity of the alloy brazing stock is accomplished through callendering the mesh which flattens the wire junctions thus enlarging the joint contact area and accordingly, reducing the thermal resistance across the laminate.

Figure 3:
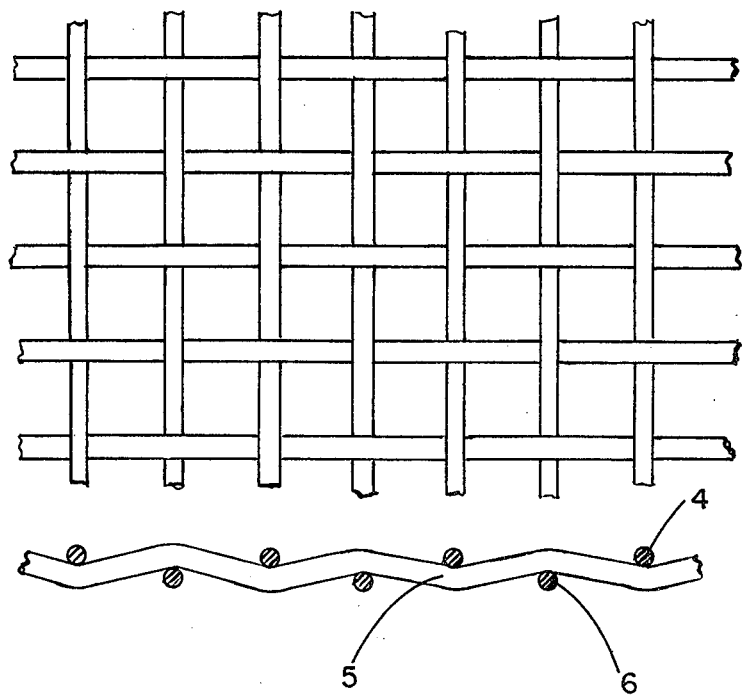
FIG. 3 is a fragmentary view of the sectioned elevation and plan views of a woven wire mesh lamina which has been callendered in preparation for stacking.

Then the cladded wire is woven into mesh by conventional metal weaving techniques. FIG. 3 depicts the resulting mesh; Part 4 is the warp, Part 5 is the woof and Part 6 is the clad brazing stock. Crimp the warp and woof intersections to fix the wires in location.

Next the mesh is cut into strips. The size of the strips is limited only by the capacity of the vacuum furnace indicated below.

Figure 4:
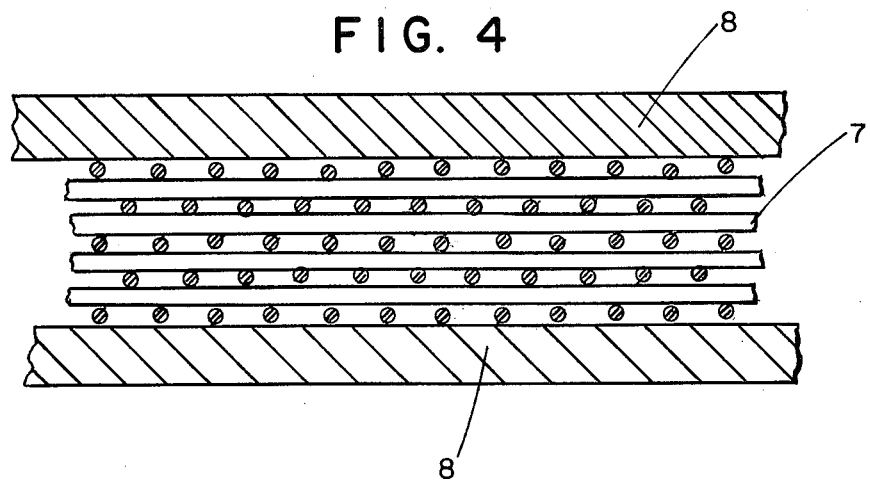
FIG. 4 is a fragmentary side elevation view of randomly stacked lamina positioned between refractory platens prepartory to brazing.

The strips of mesh are then stacked with the openings randomly oriented. The layers (FIG. 4, Pt. 7) are stacked between two slabs of refractory ceramic (Pt. 2) such as manufactured by Western Gold and Platinum Co., Type VX, ½ inch thick. Openings in the mesh are randomly staggered to provide a tortuous path for the cooling gas in the completed laminate.

After stacking, the laminate is in a vacuum oven such as manufactured by GCA Vacuum Industries which is then pump down the chamber to $10^{-4}/10^{-6}$ torr. Next the evacuated oven is heated to 1080°/1100° F. Brazing time is approximately two minutes.

The heat to the furnace is then cut off and the vacuum chamber flushed with an inert gas such as $N_2$ or $CO_2$.

The brazed part is then removed from the furnace and allowed to cool for handling. Rough edges are trimmed as desired on a band saw.

Figure 5:
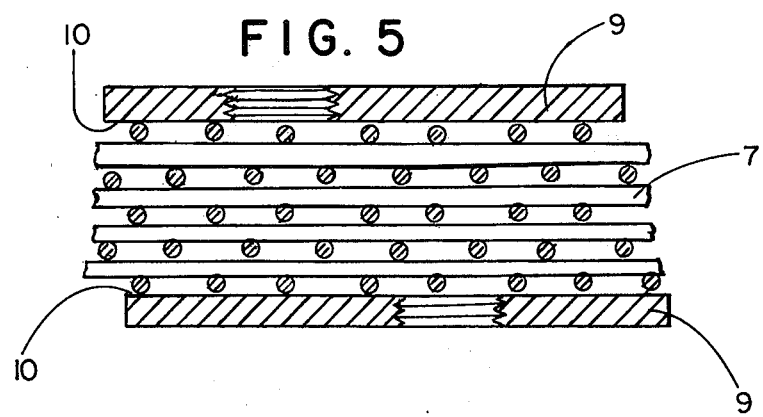
FIG. 5 is a fragmentary section elevation view of the stacked lamina with a metallic plate included with the brazed assembly, (the plate is for attachment purposes)

In the application where a plate attachment is desired, plate(s) may be placed in contact with the outer surface of the mesh and with a sheet of brazing stock at the interface. This arrangement is shown in FIG. 5; Part 7 is the laminate, Part 9 is the attaching plate, Part 10 is the brazing sheet. Platens have been omitted for clarity. In this application more than two platens are necessary because of the difference in levels of the upper surface.

In those cases where a solid thermal path is required to distribute the heat flux more uniformly to the sublayers of the laminate; the laminate is cut and stacked in a non-coextensive manner with respect to the bottom layer. This procedure may be used to form a stepped channel or stepped hole in the panel upper surface for:

1. The reception of a stepped metallic insert retained by the braze as illustrated in the exploded FIG. 6, where Part 7 shows the non-coextensive stacking, and Part 11 shows the stepped insert, and Part 12 shows the brazing stock. The brazing stock may be applied to the insert by an inlay process or alternately by the Minnesota Mining and Mfg. Co. "peen plating" process. The steps of the laminate and the insert must be held to close dimentional tolerances for realization of maximum heat transfer.

2. The reception of a flame-sprayed deposition which fills the stepped channel (or circular hole) as described in petitioner's U.S. Pat. No. 3,928,907.

What I claim as new and desire to secure by Letters Patent of the United States is:

1. The process for making a laminated porous metal panel from clad aluminum wire, said process comprising the steps of encasing a billet of aluminum in a tube of brazable aluminum alloy whose melting temperature is slightly below that of the aluminum, extruding the clad billet into wire, weaving the wire into a mesh, calendering the mesh, cleaning the mesh by vapor degreasing, randomly stacking a plurality of said lamina to form a panel and brazing the stacked lamina in a controlled atmosphere furnace.

2. The process recited in claim 1 including attaching a piece of solid metal to the surface of the lamina by being included in the brazing process and for the purpose of making attachments to said panel.

3. The process recited in claim 1 including calendering laminate after brazing to restrict transverse passage of particulate in accordance to a desired particle size.

4. The process of making a laminated porous metal panel from clad aluminum wire, said process comprising the steps of encasing a billet of aluminum in a closed-end tube of brazable aluminum alloy whose melting temperature is slightly below that of the aluminum, extruding the composite billet into wire, weaving the wire into mesh, calendering the mesh, cleaning the mesh by vapor degreasing, randomly stacking a plurality of said lamina to form a panel including arranging the upper layers of said stacked lamina in a non-coextensive manner with respect to the bottom layer so as to form a channel in the final panel upper surface for the reception of a flame-sprayed deposition, calendering the lamina, and brazing the stacked lamina in a controlled atmosphere furnace.

5. The process recited in claim 4 including stacking the lamina in a non-coextensive manner with respect to the bottom layer so as to form a channel in the panel upper surface for the reception of a metallic insert retained by the braze.

6. The process for making a laminated porous metal panel from clad aluminum wire, said process comprising the steps of encasing a billet of aluminum in a closed-end tube of brazable aluminum alloy whose melting temperature is slightly below that of aluminum, deforming the composite billet into wire, weaving the wire into mesh, calendering the mesh, cleaning the mesh by vapor degreasing, randomly stacking at least three of said lamina to form a panel and providing the uppermost layers of the lamina with concentric holes of successively increasing size from the bottom lamina layer for the reception of a flame-sprayed deposition, calendering the lamina, and brazing the stacked lamina in a controlled atmosphere furnace.

7. The process recited in claim 6 wherein the concentric holes of successively increasing size from the bottom lamina layer are for the purpose of receiving a stepped metallic insert attached to the successive layers of the lamina by being included in the brazing process and for the purpose of making attachment to the said panel.

* * * * *